(12) United States Patent
Shan

(10) Patent No.: US 11,067,862 B2
(45) Date of Patent: Jul. 20, 2021

(54) DISPLAY PANEL, MANUFACTURING METHOD THEREOF AND DISPLAY DEVICE

(71) Applicant: HKC CORPORATION LIMITED, Guangdong (CN)

(72) Inventor: Jianfeng Shan, Guangdong (CN)

(73) Assignee: HKC Corporation Limited, Shenzhen (CN)

( * ) Notice: Subject to any disclaimer, the term of this patent is extended or adjusted under 35 U.S.C. 154(b) by 0 days.

(21) Appl. No.: 17/037,762

(22) Filed: Sep. 30, 2020

(65) Prior Publication Data
US 2021/0011346 A1    Jan. 14, 2021

Related U.S. Application Data

(63) Continuation of application No. PCT/CN2018/105083, filed on Sep. 11, 2018.

(30) Foreign Application Priority Data

Jul. 17, 2018 (CN) .......................... 201810785692.3

(51) Int. Cl.
G02F 1/1362 (2006.01)

(52) U.S. Cl.
CPC .. *G02F 1/136209* (2013.01); *G02F 1/136222* (2021.01)

(58) Field of Classification Search
None
See application file for complete search history.

(56) References Cited

U.S. PATENT DOCUMENTS

2003/0043318 A1    3/2003  Kim
2019/0129262 A1*   5/2019  Yu ..................... G02F 1/1368

FOREIGN PATENT DOCUMENTS

| CN | 2001066582 A | 3/2001 |
| CN | 1540371 A | 10/2004 |
| CN | 104166280 A | 11/2014 |
| CN | 104698521 A | 6/2015 |
| CN | 106019694 A | 10/2016 |

OTHER PUBLICATIONS

First Office Action in counterpart Chinese Application No. 201810785692.3, dated Apr. 15, 2020.
International Search Report in corresponding PCT Application No. PCT/CN2018/105083, dated Dec. 20, 2018.
Written Opinion of the International Searching Authority in corresponding PCT Application No. PCT/CN2018/105083, dated Dec. 20, 2018.

* cited by examiner

*Primary Examiner* — Richard H Kim

(57) ABSTRACT

The disclosure relates to a display panel, a manufacturing method thereof and a display device. The display panel includes a substrate, a black matrix layer and a color filter layer. The black matrix layer is defined on a surface of the substrate and includes a plurality of first direction shading bars. The color filter layer is defined on the surfaces of the substrate and the black matrix layer. The color filter layer includes a plurality of photoresists, each photoresist includes an intermediate photoresist part, and two edge photoresist parts respectively connected to two sides of the intermediate photoresist part, a width of the intermediate photoresist part is larger than a width of each of the edge photoresist parts, and the width of each of the edge photoresist parts is smaller than a width of each of the first direction shading bars.

15 Claims, 3 Drawing Sheets

DISPLAY PANEL, MANUFACTURING METHOD THEREOF AND DISPLAY DEVICE

CROSS REFERENCE TO RELATED APPLICATIONS

The present disclosure is a continuation application of International Application No. PCT/CN2018/105083, filed on Sep. 11, 2018, which claims the benefit of Chinese Patent Application No. 201810785692.3, filed Jul. 17, 2018 with the National Intellectual Property Administration and entitled "DISPLAY PANEL, MANUFACTURING METHOD THEREOF AND DISPLAY DEVICE", the entirety of which is hereby incorporated herein by reference for all purposes.

FIELD

The disclosure relates to the field of display technology, and in particular to a display panel, a manufacturing method thereof and a display device.

BACKGROUND

Liquid Crystal Display (LCD) has many advantages, such as, having thin body, power saving, and no radiation, and has been widely used in that, for example, liquid crystal television, mobile phone, personal digital assistant (PDA), digital camera, computer screen, or notebook computer screen. LCD is dominant in the field of flat panel display.

The liquid crystal display panel realizes color display via a color filter. Two adjacent RGB photoresists in the color filter should not be too far apart to avoid damaging the aperture ratio. However, being too close to each other will result in a narrow gap with a larger depth, which is prone to generate bubbles in the photoresist gap when injecting liquid crystal, thus affecting the display effect of the liquid crystal display panel.

SUMMARY

An embodiment of the present disclosure provides a display panel, a manufacturing method thereof and a display device, to avoid forming narrow gaps with greater depth between adjacent photoresists, thus to reduce the possibility of generating bubbles during liquid crystal injection.

The present disclosure provides a display panel, the display panel includes:

a substrate;

a black matrix layer, disposed on a surface of the substrate, the black matrix layer including a plurality of first direction shading bars; and a color filter layer, disposed on the surface of the substrate and a surface of the black matrix layer, the color filter layer including a plurality of photoresists, each of the photoresists including an intermediate photoresist part and two edge photoresist parts respectively connected to two sides of the intermediate photoresist part, a width of the intermediate photoresist part being larger than a width of each of the edge photoresist parts, and the width of each of the edge photoresist parts being smaller than a width of each of the first direction shading bars.

In one embodiment, a thickness of the intermediate photoresist part is greater than a thickness of each of the edge photoresist parts.

In one embodiment, the thickness of the intermediate photoresist part is greater than a sum of the thickness of one of the edge photoresist parts and a thickness of the black matrix layer.

In one embodiment, a difference value between the thickness of the intermediate photoresist part and the thickness of each of the edge photoresist parts is larger than 5 microns.

In one embodiment, the black matrix also includes a plurality of second direction shading bars, the plurality of first direction shading bars are vertically intersected with the plurality of second direction shading bars to form a plurality of interspaces.

In one embodiment, a thickness of each of the first direction shading bars is equal to a thickness of each of the second direction shading bars, and the width of each of the first direction shading bars is equal to a width of each of the second direction shading bars.

In one embodiment, the plurality of photoresists correspond to the plurality of interspaces respectively, each of the intermediate photoresist part is located in one of the interspaces and is in contact with the substrate, each of the edge photoresist parts covers part of one of the first direction shading bars.

In one embodiment, a first direction shading bar between two adjacent intermediate photoresist parts is completely covered by two adjacent edge photoresist parts, a second direction shading bar between two adjacent intermediate photoresist parts is exposed by the color filter layer.

In one embodiment, the black matrix layer includes a middle portion and an edge portion, the plurality of first direction shading bars and the plurality of second direction shading bars are located in the middle portion, the edge portion is distributed with a continuous shading material.

In one embodiment, the shading material of the edge portion is exposed by the color filter layer.

In one embodiment, the edge portion surrounds the middle portion.

In one embodiment, a thickness of the shading material distributed at the edge portion is equal to the thickness of each of the first direction shading bars.

In one embodiment, a thickness of each of the first direction shading bars is equal to a thickness of each of the second direction shading bars.

In one embodiment, adjacent edge photoresist parts of two adjacent photoresists at least partially overlap.

The present disclosure also provides a method for manufacturing a display panel, the method includes:

providing a substrate;

forming a black matrix layer on a surface of the substrate, the black matrix layer including a plurality of first direction shading bars; and forming a color filter layer on the surface of the substrate and a surface of the black matrix layer, the color filter layer including a plurality of photoresists, each of the photoresists including an intermediate photoresist part, and two edge photoresist parts respectively connected to two sides of the intermediate photoresist part, a width of the intermediate photoresist part being larger than a width of each of the edge photoresist parts, and the width of each of the edge photoresist parts being smaller than a width of each of the first direction shading bars, a thickness of the intermediate photoresist part being larger than a thickness of each of the edge photoresist parts.

In one embodiment, adjacent edge photoresist parts of two adjacent photoresists at least partially overlap.

The present disclosure further provides a display device, the display device includes:

an array substrate, the array substrate including a plurality of pixel structures; and a display panel, the display panel including a substrate, a black matrix layer, and a color filter layer, the black matrix layer being defined on a surface of the substrate, and including a middle portion and an edge portion, the middle portion including a plurality of first direction shading bars and a plurality of second direction shading bars, the plurality of first direction shading bars vertically intersecting with the plurality of second direction shading bars to form a plurality of interspaces, the color filter layer being defined on a surfaces of the substrate and the black matrix layer, the color filter layer including a plurality of photoresists corresponding to the plurality of pixel structures respectively, each of the photoresists including an intermediate photoresist part, and two edge photoresist parts respectively connected to two sides of the intermediate photoresist part, each of the intermediate photoresist parts being located in one of the interfaces and being in contact with the substrate, a thickness of the intermediate photoresist part being larger than a thickness of each of the edge photoresist parts, a width of the intermediate photoresist part being larger than a width of each of the edge photoresist parts, each of the edge photoresist parts covering part of one of the first direction shading bars, and the width of each of the edge photoresist parts being smaller than a width of each of the first direction shading bar, adjacent edge photoresist parts of two adjacent photoresists partially overlapping.

In one embodiment, a first direction shading bar between two adjacent intermediate photoresist parts is completely covered by two adjacent edge photoresist parts, a second direction shading bar between two adjacent intermediate photoresist parts is exposed by the color filter layer.

In one embodiment, the edge portion surrounds the middle portion, the edge portion is distributed with a continuous shading material, and the shading material of the edge portion is exposed by the color filter layer.

In one embodiment, the display device further includes a liquid crystal layer and a frame, the liquid crystal layer being located between the array substrate and the display panel, the frame being defined on the shading material distributed at the edge portion and surrounding the liquid crystal layer, to seal the liquid crystal layer between the array substrate and the display panel.

In the display panel and the display device, each photoresist includes an intermediate photoresist of normal thickness and an edge photoresist of thinner thickness, so that there won't exist a deep narrow gap between the two adjacent photoresists, thus reducing the possibility of generating bubble in the gap during injection of liquid crystal.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only about some embodiments of the present disclosure, and persons of ordinary skill in the art can derive other drawings from the accompanying drawings without creative efforts.

DETAILED DESCRIPTION OF THE EMBODIMENTS

Figure 1:
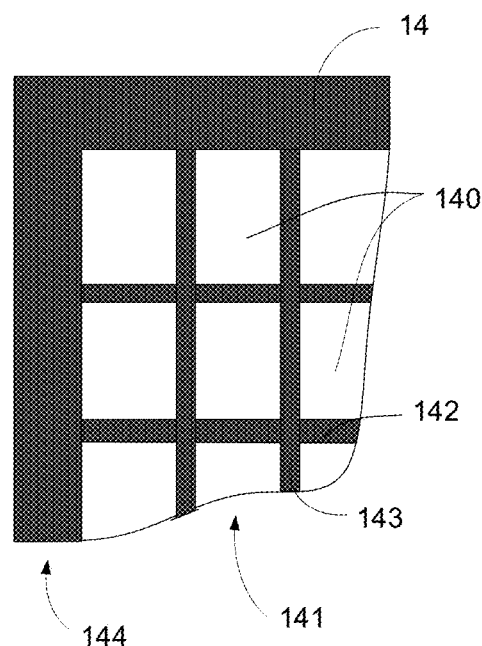
FIG. 1 is a schematic partial top view of a color filter substrate of a display panel in one embodiment of the present disclosure, the color filter substrate is glass substrate.

In order to make the purpose, technical scheme and advantages of the disclosed embodiments more clear, the technical scheme in the disclosed embodiments will be described clearly and completely below in conjunction with the drawings in the disclosed embodiments. Obviously, the described embodiments are part of the disclosed embodiments, not all embodiments. All other embodiments obtained by persons skilled in the art based on the embodiments of the present disclosure without creative efforts shall fall within the protection scope of the present disclosure.

The following description of various embodiments refers to the appended drawings to illustrate specific embodiments in which the present disclosure may be implemented. The directional terms mentioned in this disclosure, such as "up", "down", "front", "back", "left", "right", "inside", "outside" and "side" are only the directions referring to the appended drawings. Therefore, directional terms are used to illustrate and understand the present disclosure, not to limit the present disclosure.

The drawings and description are to be considered as illustrative in nature and not restrictive. In the drawings, elements with similar structures are denoted by the same reference labels. In addition, the size and thickness of each component shown in the drawings are arbitrarily shown for understanding and convenience of description, but the present disclosure is not limited thereto.

In addition, in the specification, unless explicitly described to the contrary, the word "including" will be understood to mean including the described components, but not excluding any other components. Furthermore, in the specification, "on" means above or below the target component, and does not mean that it must be on top based on the direction of gravity.

In order to further illustrate the technical means and efficacy of the present disclosure to achieve the intended purpose of disclosure, a detailed description of the specific implementation, structure, features and efficacy of a display panel and display device according to the present disclosure will be given below in conjunction with the accompanying drawings and preferred embodiments.

As shown in FIGS. 1 to 5, a display panel provided in one embodiment of the present disclosure includes a substrate, a black matrix layer 14, and a color filter layer 16. The substrate may be a glass substrate, a transparent resin substrate, or a panel substrate structure composed of a transparent substrate, a TFT array, a transparent conductive layer, a liquid crystal layer, etc. Of course, other structures including transparent substrates may also be used. In this embodiment, the substrate is a glass substrate 12, and the glass substrate 12, the black matrix layer 14, and the color filter layer 16 constitute the color filter substrate 10. It is also believed that the display panel provided by the present disclosure may be a panel structure including the color filter substrate 10, but may also be a panel structure including an array substrate, a liquid crystal layer, and the color filter substrate 10, or other panel structures including the color filter substrate 10.

The black matrix layer 14 is defined on the surface of the glass substrate 12, and the black matrix layer 14 includes a middle portion 141 and an edge portion 144 surrounding the middle portion 141. The middle portion 141 includes a plurality of first direction shading bars and a plurality of second direction shading bars. In this embodiment, the first direction is perpendicular to the second direction, the first direction shading bar is a longitudinal shading bar 143, and the second direction shading bar is a transverse shading bar 142. The plurality of transverse shading bars 142 and the plurality of longitudinal shading bars 143 vertically intersect to form a plurality of interspaces 140. The thickness and width of the transverse shading bars 142 are consistent with the thickness and width of the longitudinal shading bars 143, respectively. The edge portion 144 includes a continuous and annular shading material disposed at the edge of the glass substrate 12. The thickness of the shading material distributed at the edge portion 144 is consistent with the thickness of the transverse shading bar 142, and the width of the shading material distributed at the edge portion 144 may be larger than the width of the transverse shading bar 142. Of course, it will be understood by those skilled in the art that the structure of the black matrix layer 14 is not limited to this, but may be other structures, such as not including the edge portion 144 but only including a plurality of transverse shading bars 142 and a plurality of longitudinal shading bars 143 intersecting with each other.

The color filter layer 16 is defined on the surfaces of the glass substrate 12 and the black matrix layer 14. The color filter layer 16 includes a plurality of photoresists corresponding to the plurality of interspaces 140 respectively. Specifically, the color filter layer 16 includes a plurality of first photoresists 161, a plurality of second photoresists 162, and a plurality of third photoresists 163. In this embodiment, the first photoresist may be a red photoresist, the second photoresist may be a green photoresist, and the third photoresist may be a blue photoresist. Of course, those skilled in the art will understand that the type of photoresist in the color filter layer 16 is not limited thereto. For example, it may also include a white photoresist, or it may also include a yellow photoresist, or other photoresists.

Each photoresist includes an intermediate photoresist part 1601, and two edge photoresists parts 1602 respectively connected to two sides of the intermediate photoresist part, each intermediate photoresist 1601 is in a corresponding interspace 140 and is in contact with the surface of the glass substrate 12, each edge photoresist 1602 is located on and in contact with the surface of a longitudinal shading bar 143. The thickness of the intermediate photoresist part 1601 is larger than the thickness of the edge photoresist part 1602. Optionally, the thickness of the intermediate photoresist 1601 is greater than the sum of the thickness of the edge photoresist 1602 and the thickness of the black matrix layer 14. Optionally, the difference value between the thickness of the intermediate photoresist 1601 and the thickness of the edge photoresist 1602 is greater than 5 microns. The width of the intermediate photoresist 1601 is larger than the width of the edge photoresist 1602. Specifically, the width of the intermediate photoresist part 161 is larger than the width of the longitudinal light blocking bar 143, and the width of the longitudinal light blocking bar 143 is larger than the width of the edge photoresist part 1602. Optionally, the difference value between the thickness of the intermediate photoresist 1601 and the thickness of the edge photoresist 1602 is greater than 5 microns.

Figure 2:
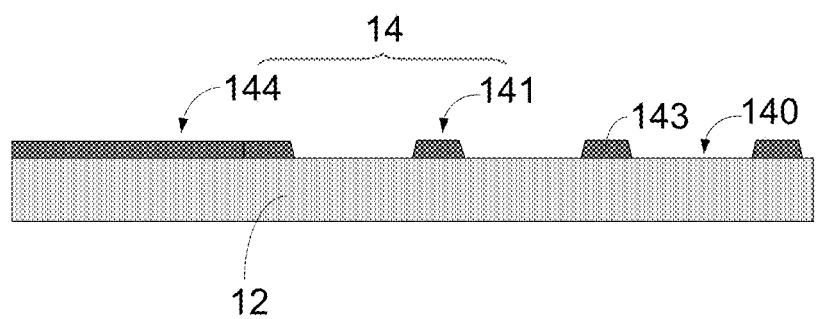
FIG. 2 is a schematic partial cross-sectional view of a display panel in one embodiment of the present disclosure, the display panel is provided with a black matrix layer defined on the color filter substrate of the display panel, the color filter substrate is glass substrate.
Figure 3:
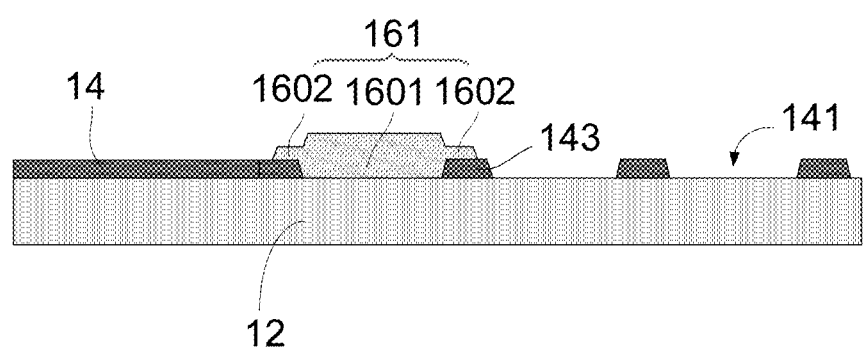
FIG. 3 is a schematic partial cross-sectional view of a display panel, the display panel is provided with a red photoresist defined on the glass substrate and the black matrix layer of FIG. 2.
Figure 4:
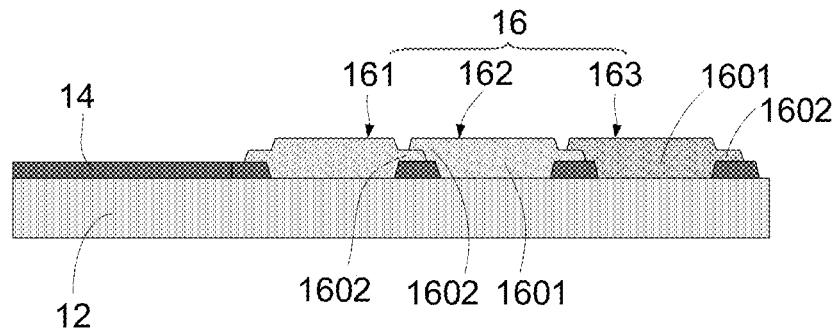
FIG. 4 is a schematic partial cross-sectional view of a display panel, the display panel is provided with a green photoresist and a blue photoresist defined on the glass substrate and the black matrix layer of FIG. 3.

Those skilled in the art will understand that when fabricating the color filter substrate 10, the black matrix layer 14 is first formed on the glass substrate 12 by photolithography, as shown in FIG. 2; Then, a plurality of photoresists are fabricated on the black matrix layer 14 by photolithography to form the color filter layer 16, as shown in FIGS. 3 and 4. For example, when fabricating the color filter layer 16, a plurality of patterned red photoresist 161 are first formed on the glass substrate 12 and the black matrix layer 14 by steps such as printing red photoresist layer, patterned exposing the red photoresist layer, developing the exposed red photoresist layer, and etching the developed red photoresist layer. Specifically, at the time of exposure, the section where the intermediate photoresist part 1601 is to be formed is shielded, so that the red photoresist layer of this section is not exposed, thereby, the red photoresist layer of this section is not etched in the etching process and the intermediate photoresist part 1601 is thereby formed; the section where the edge photoresist part 1602 is to be formed is masked with a semi-transparent semi-mask, so that the red photoresist layer of this section is exposed to a certain extent, thereby the red photoresist layer of this section is partially etched in the etching process, forming an edge photoresist part 1602 of thinner thickness; and the red photoresist layer of other sections are completely exposed, so that the red photoresist layer of the other sections are completely etched away in the etching process, thereby part of the black matrix layer 14 and part of the glass substrate 12 are exposed. After forming a plurality of the red photoresists 161 through the above process, a plurality of green photoresists 162 are formed through the same process, finally a plurality of blue photoresists 163 are formed. Each of the green photoresists 162 and each of the blue photoresists 163 have a thicker intermediate photoresist part 1601 and a thinner edge photoresist part 1602. Each green photoresist 162 is adjacent to a red photoresist 161 and a blue photoresist 163. Those skilled in the art will understand that the intermediate photoresist portion 1601 and the edge photoresist portion 1602 of each photoresist are integrally formed by the same process, or may be manufactured by methods other than the above steps. For example, the same shading mask is used to shield the section where the intermediate photoresist part and the edge photoresist part are to be formed, and during exposure, the scattered exposure light irradiates the photoresist layer section where the edge photoresist part is to be formed, so that the photoresist layer of this section is partially etched.

It should be noted that the edge photoresist part 1602 of the two adjacent photoresists on the left and right are at least partially overlapped to ensure that there is no gap between the two adjacent photoresists on the left and right. In this way, there will be no deep narrow gap between adjacent photoresists, reducing the possibility of bubble generation in the gap when liquid crystal is injected. Moreover, since the edge photoresist part 1602 is thinner, even if the two edge photoresist parts 1602 overlap, the thickness of the overlap would not be too large to affect the liquid crystal cell. To take a step back, even if the two adjacent photoresists on the left and right do not overlap, due to the existence of the thinner edge photoresist part 1602, and that the gap between the adjacent photoresists is also relatively shallow, the possibility of generating bubbles in the gap when injecting liquid crystal is also reduced to a certain extent.

Figure 5:
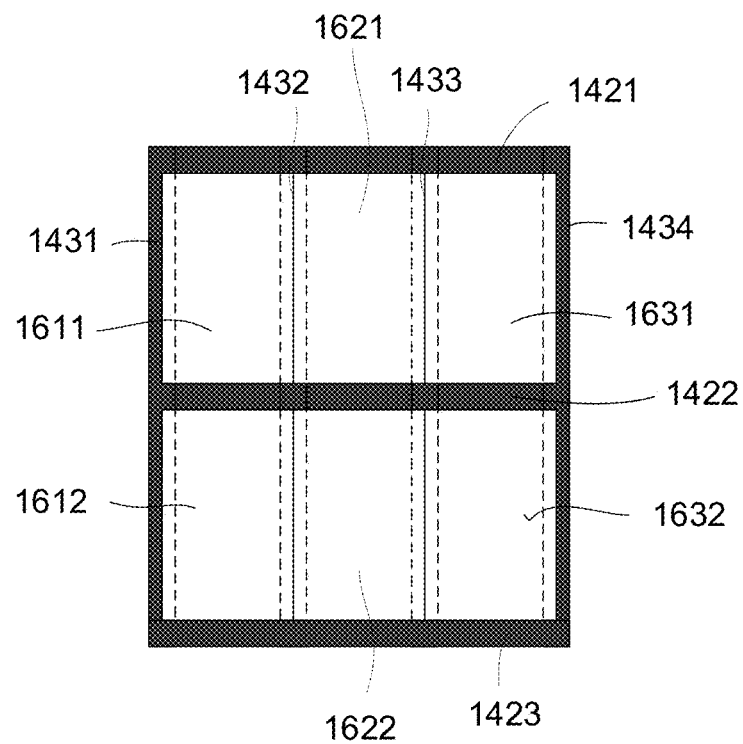
FIG. 5 is a schematic partial top view of the middle part of the color filter substrate of a display panel according to one embodiment of the present disclosure.

It can be understood by those skilled in the art that FIG. 5 only schematically depicts part of the photoresists and part of the shading bars in the middle area of the color filter substrate 10 to fully illustrate the positional relationship between the photoresist and the shading bar. For example, as shown in FIG. 5, the black matrix layer 14 includes a first transverse shading bar 1421, a second transverse shading bar 1422, a third transverse shading bar 1423, a first longitudinal shading bar 1431, a second longitudinal shading bar 1432, a third longitudinal shading bar 1433, and a fourth longitudinal shading bar 1434. The color filter layer 16 includes a first red photoresist 1611, a first green photoresist 1621, a first blue photoresist 1631, a second red photoresist 1612, a second green photoresist 1622, and a second blue photoresist 1632. The first red photoresist 1611, the first green photoresist 1621, and the first blue photoresist 1631 are sequentially defined between the first transverse shading bar 1421 and the second transverse shading bar 1422. Moreover, the first red photoresist 1611 is between the first longitudinal shading bar 1431 and the second longitudinal shading bar 1432, the first green photoresist 1621 is between the second longitudinal shading bar 1432 and the third longitudinal shading bar 1433, and the first blue photoresist 1631 is between the third longitudinal shading bar 1433 and the fourth longitudinal shading bar 1434. The second red photoresist 1612, the second green photoresist 1622, and the second blue photoresist 1632 are sequentially defined between the second transverse shading bar 1422 and the third transverse shading bar 1423, and are respectively positioned below the first red photoresist 1611, the first green photoresist 1621, and the first blue photoresist 1631. The second longitudinal shading bar 1432 between the first red photoresist 1611 and the first green photoresist 1621 is completely covered by the edge photoresist part 1602 of the first red photoresist 1611 and the edge photoresist part 1602 of the first green photoresist 1621. The second vertical light blocking bar 1432 between the second red photoresist 1612 and the second green photoresist 1622 is completely covered by the edge photoresist part 1602 of the second red photoresist 1612 and the edge photoresist part 1602 of the second green photoresist 1622. The third vertical shading bar 1433 between the first green photoresist 1621 and the first blue photoresist 1631 is completely covered by the edge photoresist part 1602 of the first green photoresist 1621 and the edge photoresist part 1602 of the first blue photoresist 1631. The third vertical shading bar 1433 between the second green photoresist 1622 and the second blue photoresist 1632 is completely covered by the edge photoresist 1602 part of the second green photoresist 1622 and the edge photoresist part 1602 of the second blue photoresist 1632. The first transverse light blocking bar 1421, the second transverse light blocking bar 1422, and the third transverse light blocking bar 1423 are not covered by the color filter layer 16 and are exposed. That is to say, the longitudinal shading bars between two adjacent photoresists are covered by the color filter layer 16, while the transverse shading bars are not covered.

It should be noted that the shading material of the edge portion 144 is also not covered by the color filter layer 16 and is exposed. The edge portion 144 accounts for less than 10% of the black matrix layer 14.

Figure 6:
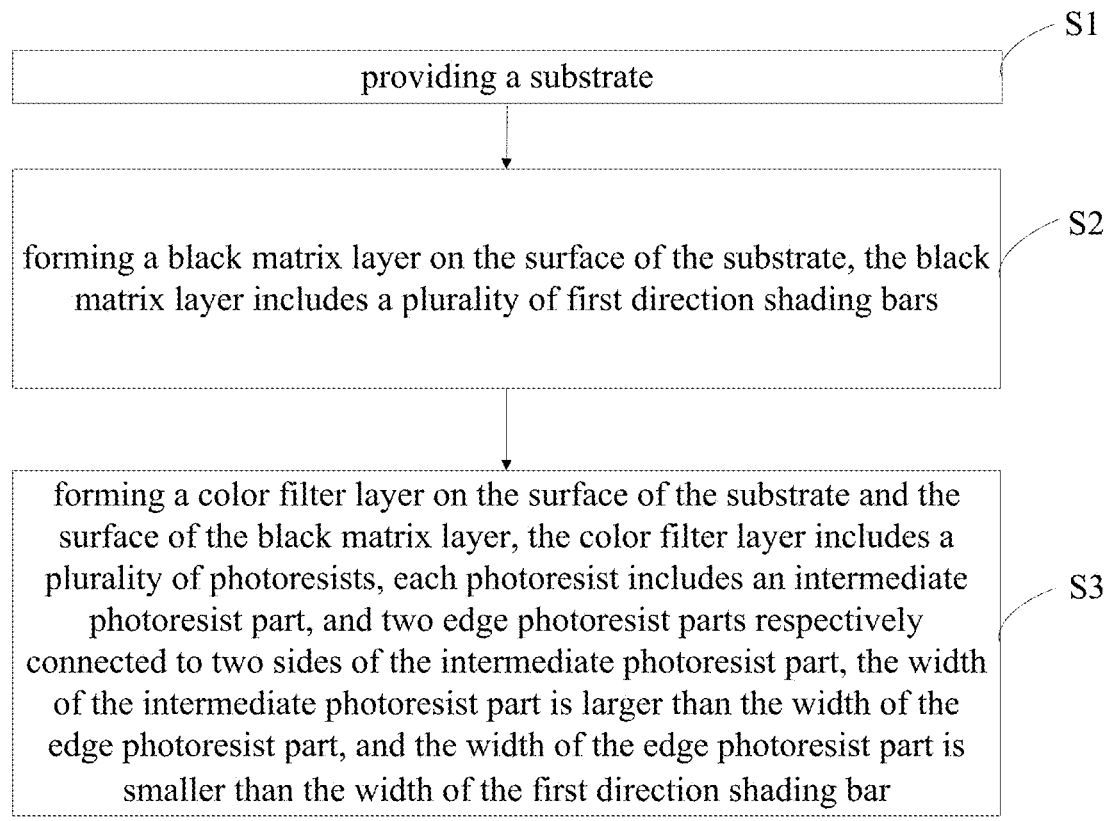
FIG. 6 is a flowchart of manufacturing a display panel in one embodiment of the disclosure.

As shown in FIG. 6, the manufacturing method of a display panel provided in one embodiment of the present disclosure includes the following steps.

S1, providing a substrate;

S2, forming a black matrix layer on the surface of the substrate, the black matrix layer includes a plurality of first direction shading bars;

S3, forming a color filter layer on the surface of the substrate and the surface of the black matrix layer, the color filter layer includes a plurality of photoresists, each photoresist includes an intermediate photoresist part, and two edge photoresist parts respectively connected to two sides of the intermediate photoresist part, the width of the intermediate photoresist part is larger than the width of the edge photoresist part, and the width of the edge photoresist part is smaller than the width of the first direction shading bar.

The specific manufacturing process is as described above and shown in FIGS. 2 to 4.

Figure 7:
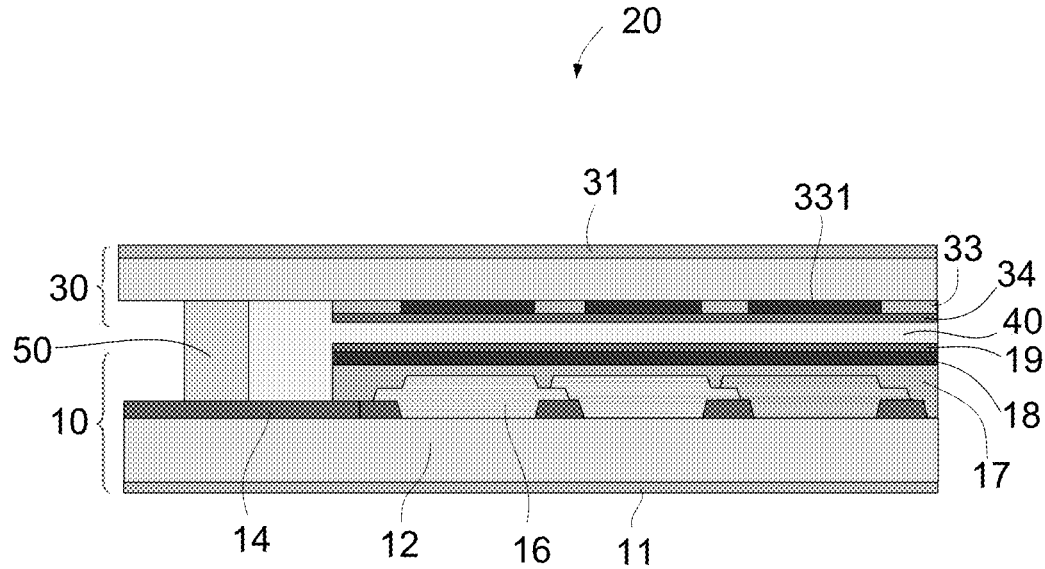
FIG. 7 is a schematic partial cross-sectional view of a liquid crystal display device in one embodiment of the disclosure.

As shown in FIG. 7, a display device provided in one embodiment of the present disclosure includes a display panel as shown above. The display device may be, for example, a liquid crystal display device, an OLED display device, a QLED display device, a curved display device, or other display devices. Hereinafter, only the liquid crystal display device will be described as an example.

The display device 20 of this embodiment includes an array substrate 30, a liquid crystal layer 40, and the color filter substrate 10 as described above. The liquid crystal layer 40 is between the array substrate 30 and the color filter substrate 10.

The array substrate 30 includes a glass substrate 32 and a pixel structure layer 34, the pixel structure layer 34 includes a plurality of pixel structures 340 defined in an array, and is composed of a plurality of scan lines, a plurality of data lines, an active element array and a pixel electrode array. It can also be portrayed that each pixel structure 340 is composed of a scanning line, a data line, an active element such as a thin film transistor and a pixel electrode. Optionally, the array substrate 30 further includes a first polarizer 31 and a first alignment layer 35. The first polarizing light 31, the glass substrate 32, the pixel structure layer 34 and the first alignment layer 35 are defined sequentially.

Optionally, the color filter substrate 10 further includes a second polarizer 11, a protective layer 17, a transparent conductive layer 18, and a second alignment layer 19. The second polarizer 11, the glass substrate 12, the black matrix layer 14, the color filter layer 16, the protective layer 17, the transparent conductive layer 18 and the second alignment layer 19 are defined sequentially.

The liquid crystal layer 40 is disposed between the array substrate 30 and the color filter substrate 10, specifically between the first alignment layer 35 and the second alignment layer 19. Optionally, a plurality of spacers are also defined between the first alignment layer 35 and the second alignment layer 19 to maintain an appropriate gap between the glass substrate 32 and the glass substrate 12.

Optionally, a frame 50 is also defined between the array substrate 30 and the color filter substrate 10 to frame the liquid crystal layer 40. The frame 50 is disposed on the shading material of the edge portion 144 and surrounds the liquid crystal layer 40 to frame the liquid crystal layer 40 between the array substrate 30 and the color filter substrate 10.

In the display panel 10 and the display device 20 described above, each photoresist includes an intermediate photoresist 1601 of normal thickness and an edge photoresist 1602 of thinner thickness, so that there is no deep narrow gap between the two adjacent photoresists, reducing the possibility of generating bubbles in the gap when liquid crystal is injected. Furthermore, the edge photoresist parts 1602 of the two adjacent photoresists overlap at least partially, not only improving the aperture ratio, but also smoothing the surface of the color filter layer 16, reducing the gap and the defective rate during liquid crystal injection, thereby reducing the possibility of bubble generation and improving the production yield.

The terms "in some embodiments" and "in various embodiments" are repeatedly used. The term generally does not refer to the same embodiment; but it may also refer to the same embodiment. The words "comprising", "having" and "including" are synonyms unless the context shows other meanings.

The above is only the preferred embodiment of the present disclosure, and is not intended to limit the present disclosure in any form. Although the present disclosure has been disclosed with specific embodiments, it is not intended to limit the present disclosure. Any person skilled in the art may make equivalent embodiments with some equivalent changes or modifications according to the above technical content without departing from the technical solution of the present disclosure. Any simple modifications, equivalent changes and modifications made to the above embodiments without departing from the technical solution of the present disclosure according to the technical essence of the present disclosure are within the scope of the technical solution of the present disclosure.

What is claimed is:

1. A display panel comprising:
   a substrate;
   a black matrix layer, disposed on a surface of the substrate, the black matrix layer comprising a plurality of first direction shading bars and a plurality of second direction shading bars, and the plurality of first direction shading bars are vertically intersected with the plurality of second direction shading bars to form a plurality of interspaces; and
   a color filter layer, disposed on the surface of the substrate and a surface of the black matrix layer, the color filter layer comprising a plurality of photoresists, each of the photoresists comprising an intermediate photoresist part and two edge photoresist parts respectively connected to two sides of the intermediate photoresist part, a width of the intermediate photoresist part being larger than a width of each of the edge photoresist parts, and the width of each of the edge photoresist parts being smaller than a width of each of the first direction shading bars, wherein:
   a thickness of the intermediate photoresist part is greater than a thickness of each of the edge photoresist parts;
   the plurality of photoresists correspond to the plurality of interspaces respectively, each of the intermediate photoresist part is located in one of the interspaces and is in contact with the substrate, and each of the edge photoresist parts covers part of one of the first direction shading bars; and
   a first direction shading bar between two adjacent intermediate photoresist parts is completely covered by two adjacent edge photoresist parts, and a second direction shading bar between two adjacent intermediate photoresist parts is exposed by the color filter layer.

2. The display panel according to claim 1, wherein the thickness of the intermediate photoresist part is greater than a sum of the thickness of one of the edge photoresist parts and a thickness of the black matrix layer.

3. The display panel according to claim 1, wherein a difference value between the thickness of the intermediate photoresist part and the thickness of each of the edge photoresist parts is larger than 5 microns.

4. The display panel according to claim 1, wherein a thickness of each of the first direction shading bars is equal to a thickness of each of the second direction shading bars, and the width of each of the first direction shading bars is equal to a width of each of the second direction shading bars.

5. The display panel according to claim 1, wherein the black matrix layer comprises a middle portion and an edge portion, the plurality of first direction shading bars and the plurality of second direction shading bars are located in the middle portion, and the edge portion is distributed with a continuous shading material.

6. The display panel according to claim 5, wherein the shading material of the edge portion is exposed by the color filter layer.

7. The display panel according to claim 5, wherein the edge portion surrounds the middle portion.

8. The display panel according to claim 5, wherein a thickness of the shading material distributed at the edge portion is equal to the thickness of each of the first direction shading bars.

9. The display panel according to claim 8, wherein a thickness of each of the first direction shading bars is equal to a thickness of each of the second direction shading bars.

10. The display panel according to claim 1, wherein adjacent edge photoresist parts of two adjacent photoresists at least partially overlap.

11. A method for manufacturing a display panel, comprising:
    providing a substrate;
    forming a black matrix layer on a surface of the substrate, and the black matrix layer comprising a plurality of first direction shading bars and a plurality of second direction shading bars, wherein the plurality of first direction shading bars are vertically intersected with the plurality of second direction shading bars to form a plurality of interspaces; and
    forming a color filter layer on the surface of the substrate and a surface of the black matrix layer, the color filter layer comprising a plurality of photoresists, each of the photoresists comprising an intermediate photoresist part, and two edge photoresist parts respectively connected to two sides of the intermediate photoresist part, a width of the intermediate photoresist part being larger than a width of each of the edge photoresist parts, and the width of each of the edge photoresist parts being smaller than a width of each of the first direction shading bars, and a thickness of the intermediate photoresist part being larger than a thickness of each of the edge photoresist parts, the plurality of photoresists corresponding to the plurality of interspaces respectively, each of the intermediate photoresist part being located in one of the interspaces and in contact with the substrate, and each of the edge photoresist parts covering part of one of the first direction shading bars; and
    a first direction shading bar between two adjacent intermediate photoresist parts being completely covered by two adjacent edge photoresist parts, and a second direction shading bar between two adjacent intermediate photoresist parts being exposed by the color filter layer.

12. The method according to claim 11, wherein adjacent edge photoresist parts of two adjacent photoresists at least partially overlap.

13. A display device, comprising:
an array substrate, the array substrate comprising a plurality of pixel structures; and
a display panel, the display panel comprising a substrate, a black matrix layer, and a color filter layer, the black matrix layer being defined on a surface of the substrate, and comprising a middle portion and an edge portion, the middle portion comprising a plurality of first direction shading bars and a plurality of second direction shading bars, the plurality of first direction shading bars vertically intersecting with the plurality of second direction shading bars to form a plurality of interspaces, the color filter layer being defined on a surfaces of the substrate and the black matrix layer, the color filter layer comprising a plurality of photoresists corresponding to the plurality of pixel structures respectively, each of the photoresists comprising an intermediate photoresist part, and two edge photoresist parts respectively connected to two sides of the intermediate photoresist part, each of the intermediate photoresist parts being located in one of the interfaces and being in contact with the substrate, a thickness of the intermediate photoresist part being larger than a thickness of each of the edge photoresist parts, a width of the intermediate photoresist part being larger than a width of each of the edge photoresist parts, each of the edge photoresist parts covering part of one of the first direction shading bars, and the width of each of the edge photoresist parts being smaller than a width of each of the first direction shading bar, adjacent edge photoresist parts of two adjacent photoresists partially overlapping, wherein:
a first direction shading bar between two adjacent intermediate photoresist parts is completely covered by two adjacent edge photoresist parts, and a second direction shading bar between two adjacent intermediate photoresist parts is exposed by the color filter layer.

14. The display device according to claim 13, wherein the edge portion surrounds the middle portion, and the edge portion is distributed with a continuous shading material, the shading material of the edge portion is exposed by the color filter layer.

15. The display device according to claim 13, further comprising a liquid crystal layer and a frame, the liquid crystal layer being located between the array substrate and the display panel, and the frame being defined on the shading material distributed at the edge portion and surrounding the liquid crystal layer, to seal the liquid crystal layer between the array substrate and the display panel.

* * * * *